United States Patent [19] [11] 4,100,816
Clark [45] Jul. 18, 1978

[54] MANUAL CONTROL APPARATUS

[76] Inventor: Malcolm D. Clark, 4 St. Ronans Drive, Glascow G413 SJ, Scotland

[21] Appl. No.: 734,828

[22] Filed: Oct. 22, 1976

[30] Foreign Application Priority Data

Nov. 29, 1975 [GB] United Kingdom ............... 49136/75

[51] Int. Cl.² ..................... F16H 27/02; F16H 29/20; F16K 31/53; F15B 13/10
[52] U.S. Cl. ................................. 74/89.14; 74/89.17; 74/625; 251/14; 251/58; 91/391 R; 92/136
[58] Field of Search .................. 74/89.1, 83, 841, 842, 74/22 A, 29, 625, 89.14, 89.17; 102/89 R; 251/14, 58; 91/391 R; 92/136

[56] References Cited

U.S. PATENT DOCUMENTS

| 1,665,227 | 4/1928 | Smith | 74/625 |
| 1,943,854 | 1/1934 | Beckwith | 251/140 |
| 3,080,852 | 3/1963 | Geyer | 92/136 |
| 3,252,380 | 5/1966 | Jablonsky et al. | 92/136 |
| 3,566,751 | 3/1971 | Sheppard | 92/136 |
| 3,951,042 | 4/1976 | Weiss | 91/393 |
| 3,982,725 | 9/1976 | Clark | 251/14 |
| 4,036,110 | 7/1977 | Galonska et al. | 91/391 R |

Primary Examiner—Samuel Scott
Assistant Examiner—W. R. Henderson
Attorney, Agent, or Firm—Browning, Bushman & Zamecki

[57] ABSTRACT

The apparatus of the present invention may comprise a housing or other stationary member which may have a chamber therein. A drive member is disposed in the chamber for movement therein. An elongate torque transmission member is rotatably mounted in the housing so as to extend into the chamber toward the drive member. Means are provided to prevent the torque transmission member from moving longitudinally with respect to the housing. An annular connector is disposed between the torque transmission member and the drive member. The connector is connected to the torque transmission member for longitudinal but non-rotating relative movement and threadedly connected to the drive member. Thus the connector can be moved longitudinally along the torque transmission member during normal or automatic operation of the actuator. However, upon rotation of the torque transmission member, with the connector abutting a suitable stop member, the drive member may be caused to move relative to the torque transmission member and the connector.

22 Claims, 6 Drawing Figures

MANUAL CONTROL APPARATUS

BACKGROUND OF THE INVENTION

1. Field of the Invention

The present invention pertains to manual control apparatus for mechanisms having movable members. Such mechanisms include actuators of the type which employ reciprocating movement of a drive member, such as a piston. The actuator may include linkage means for converting this reciprocating movement to rotational movement which is imparted to a rotating member. In particular, the invention may be used in connection with valve actuators for valves such as butterfly or ball valves having rotating valve elements such as the actuator disclosed in my prior U.S. Pat. No. 3,982,725. The manual control apparatus may also be applied to mechanisms having either strictly reciprocating or strictly rotary movement.

In such mechanisms it is highly desirable, and usually necessary, to provide manual override means for manually moving the drive member in case of failure of the electric, hydraulic, pneumatic or other system which ordinarily operates the actuator.

2. Description of the Prior Art

In my prior U.S. Pat. No. 3,982,725, the actuator includes a pair of pistons reciprocable in a cylindrical chamber. Each piston has a skirt depending longitudinally therefrom, and a rack is formed on each of these skirts. The racks engage pinion wheels carried by a shaft extending transversely through the cylindrical chamber, the shaft in turn being drivingly connected to a valve stem or other member to be rotated.

In this prior actuator, a manual override device is provided which includes wrench means for engaging and manually rotating the shaft which carries the pinion wheels.

SUMMARY OF THE INVENTION

The present invention provides an improved manual control apparatus which can be used with the type of actuator disclosed in my prior U.S. Pat. No. 3,982,725 or with any other type of mechanism having a movable member such as a piston or a rotary shaft. In particular, the manual control apparatus may be used as an override for an actuator which is ordinarily automatically operated. One of the basic differences between the override mechanism of the present invention and that of my prior application, is that the override of the present invention can be used not only with actuators having a rotating shaft or the like driven by a reciprocating member, but also with actuators or other mechanisms in which the motion is strictly reciprocating or strictly rotary in nature.

In the mechanism of the present invention, one or more movable members are mounted for movement with respect to a stationary member. The movable members may be drive members, pistons for example, slidably disposed in a chamber in a housing for reciprocating movement therealong, the stationary member being part or all of the housing. Linkage means may be provided for converting the reciprocating movement of the drive member to rotary motion and imparting this rotary motion to a rotating member such as a valve stem located externally of the housing. The drive member is ordinarily moved by pressure fluid selectively injected into and removed from the chamber on opposite sides of the drive member.

The override means for moving the drive member in case of failure of the pressure fluid system includes an elongate torque transmission member, which is rotatably mounted in the housing and extends through the housing and into the chamber toward the drive member. The torque transmission member is fixed against longitudinal movement with respect to the housing. An annular connector is disposed between the torque transmission member and the drive member, preferably coaxial with the torque transmission member. The connector is connected to the torque transmission member for relative longitudinal but non-rotating movement and threadedly connected to the drive member. There will thus be relative movement between the connector and drive member upon rotation of the connector via the torque transmission member. Stop means are provided for limiting longitudinal movement of the connector along the torque transmission member.

If the drive member is a reciprocating member such as a piston, the torque transmission member is preferably in the form of a rod received in a bore in the drive member. The length of the connector is substantially less than those of the bore and the rod but at least slightly greater than the length of travel of the drive member. The stops are preferably disposed adjacent the longitudinally inner end of the rod and the inner surface of the housing. Under normal operating conditions, i.e. when the drive member is being reciprocated by the pressure fluid, the connector is located at the longitudinally outer end of, but substantially entirely within, the bore.

Thus when the drive member is in its longitudinally innermost position, the connector will be abutting the inner stop. Rotation of the torque transmission member in a direction which would tend to drive the connector inwardly will then, due to the abutment of the connector with the inner stop, drive the drive member outwardly. Conversely, when the drive member is in its longitudinally outermost position, the connector will be abutting the outer stop. Operation of the manual override means at this time in a direction which would tend to drive the connector outwardly will instead drive the drive member inwardly.

It is thus a principal object of the present invention to provide a manual control apparatus for a mechanism having a movable member.

Another object of the present invention is to provide a manual override for an actuator having a movable drive member.

Still another object of the invention is to provide an improved actuator and override mechanism in which a drive member moves with respect to a torque transmission member, having a connector interposed between the torque transmission member and the drive member, the connector being threaded to the drive member and splined to the torque transmission member.

Yet another object of the invention is to provide a manual override mechanism which is simple and economical to manufacture, operate and maintain.

Other objects, features, and advantages of the invention will be made apparent by the following description of the preferred embodiment, the drawings, and the claims.

DESCRIPTION OF THE PREFERRED EMBODIMENT

Figure 1:
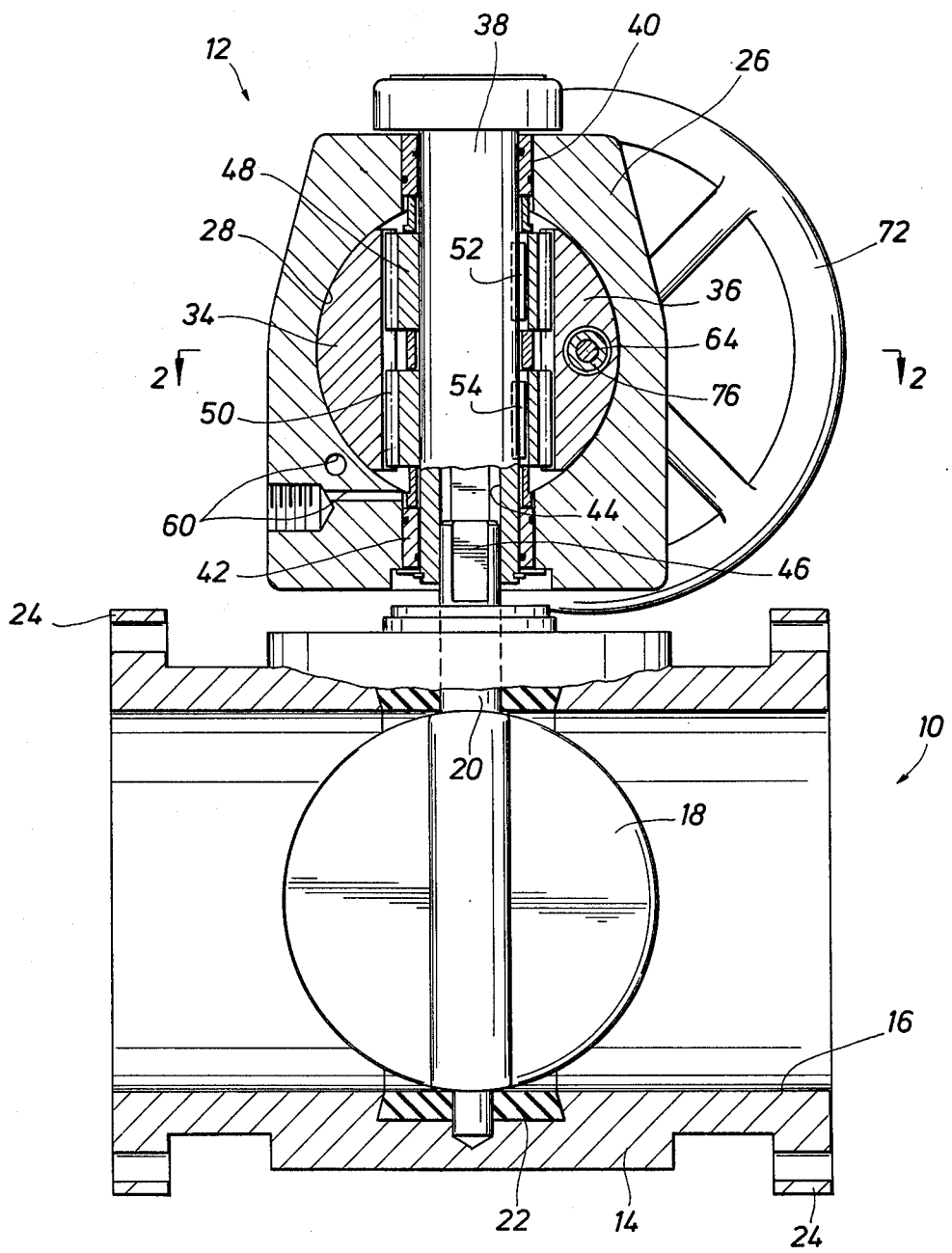
FIG. 1 is a vertical cross-sectional view of a valve and valve actuator including the manual override mechanism of the invention.

Referring now to the drawings, there is shown a valve generally designated 10 and an actuator 12. Valve 10 and actuator 12 are similar to those disclosed in my prior U.S. Pat. No. 3,982,725, the primary difference residing in the provision of the new manual override mechanism of the present invention and the omission of the manual override of the prior application. To the extent that it may be helpful in the understanding of the present invention, prior U.S. Pat. No. 3,982,725 is hereby expressly incorporated herein by reference.

The valve 10 comprises a valve body 14 having flowway 16 therethrough. A disc shaped valve element 18 is rotatably mounted in the flowway 16 by a rotatable member in the form of a shaft or valve stem 20 extending transverse to the flowway. As shown, the valve element 18 is in its open position in which fluid is permitted to flow through the flowway 16. When the valve stem 20 and attached valve element 18 are rotated 90°, the flowway 16 is closed. A valve seat 22 of rubber or other suitable material is disposed in the flowway 16 to provide a seal against valve element 18. Flanges 24 are provided at opposite ends of the valve body whereby the valve 10 can be connected into a fluid-carrying pipe or line.

Figure 2:
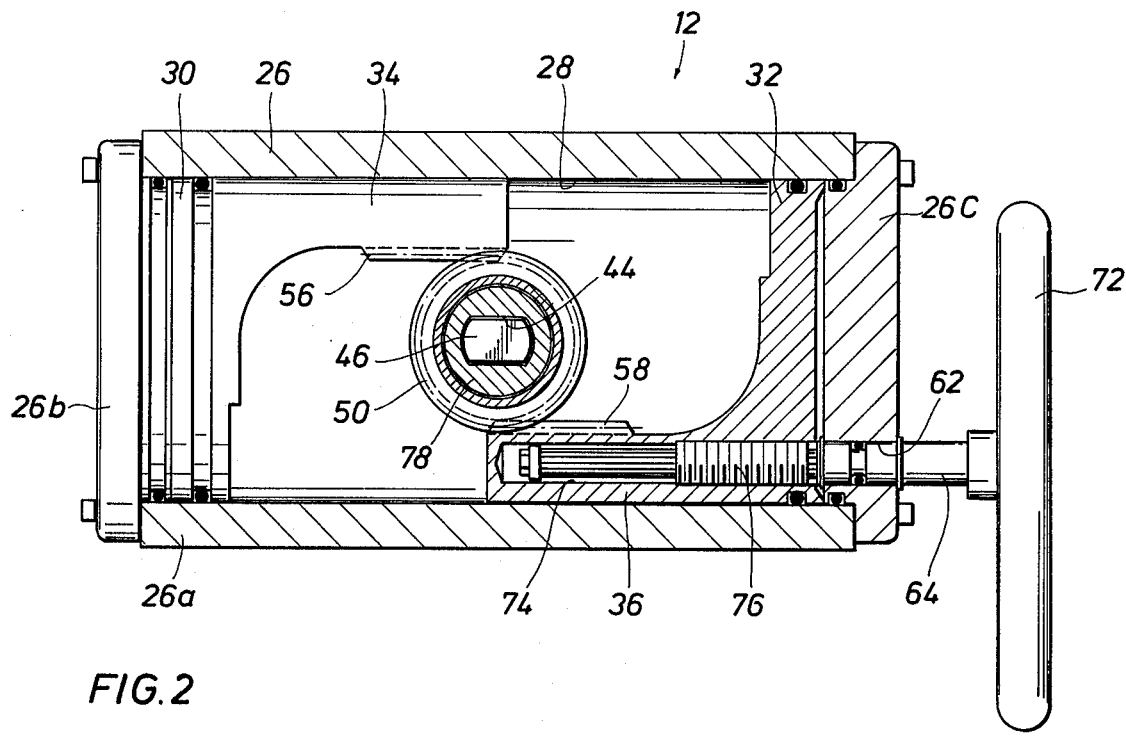
FIG. 2 is a cross-sectional view of the actuator taken on lines 2—2 of FIG. 1 and showing the pistons at the outer ends of their strokes during normal operation of the actuator.
Figure 3:
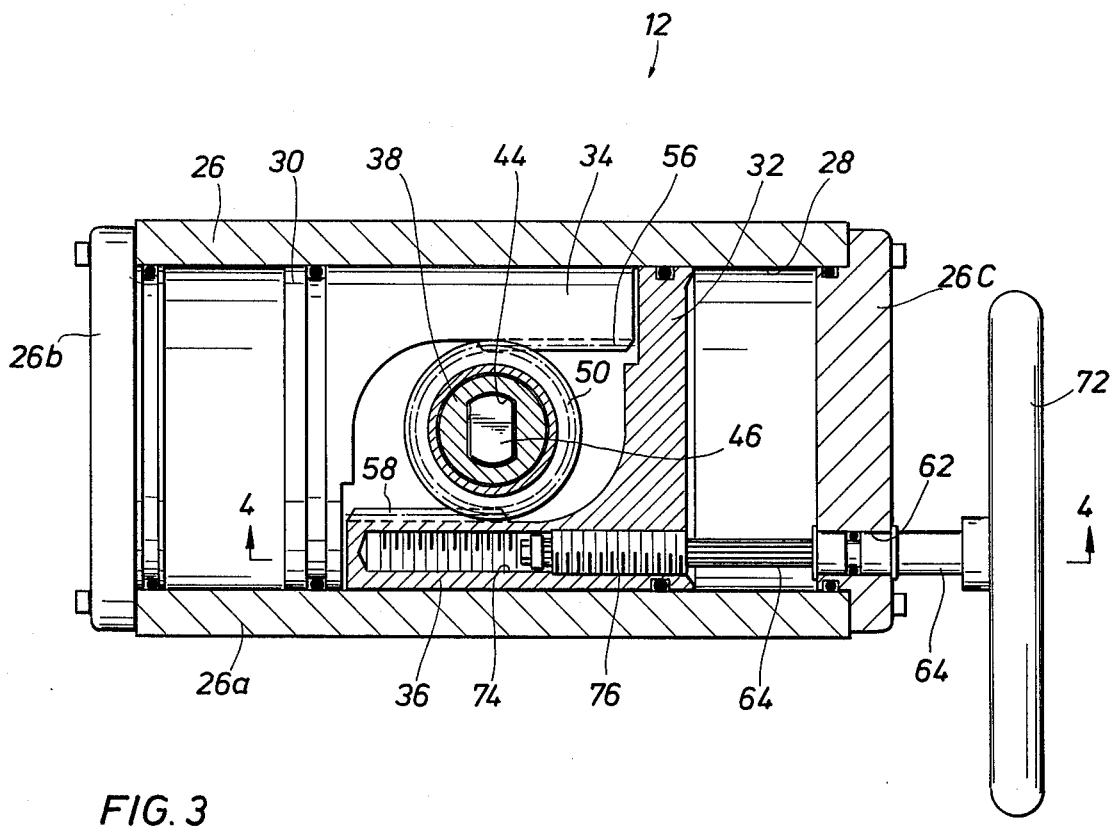
FIG. 3 is a view similar to that of FIG. 2 showing the pistons at the inner ends of their strokes during normal operation of the actuator.

The actuator 12 comprises a housing 26 having a cylindrical chamber 28 therein. A pair of drive members are slidably disposed within the chamber 28 for reciprocating movement therealong. The drive members comprise respective pistons 30 and 32 and skirts 34 and 36 each depending longitudinally inwardly from a respective one of the pistons. A shaft 38, coaxial with the valve stem 20, extends through the center of the chamber 28 transverse to the path of the drive members 30, 34 and 32, 36. The ends of the shaft 38 are rotatably mounted in suitable bearings 40 and 42 in the housing 26. The end of shaft 38 closest to valve 10 has a longitudinal bore 44 therein. Valve stem 20 has an extension 46 which protrudes from the valve body and is received within the bore 44. As best seen in FIGS. 2 and 3, both the bore 44 and the valve stem extension 46 are of somewhat rectangular transverse cross-section. They thus define mating wrench surfaces which provide for joint rotation of the shaft 38 and valve stem 20.

A pair of pinion wheels 48 and 50 are keyed to the shaft 38 as indicated at 52 and 54 to rotate therewith. Racks 56 and 58 are formed each on the radially inner side of a respective one of the skirts 34 and 36 and engage the pinion wheels 48 and 50. Pinion wheels 48 and 50, racks 56 and 58 and shaft 38 are linkage means connecting the pistons 30 and 32 with the valve stem 20.

Thus, as the pistons 30 and 32 move longitudinally inwardly toward each other, the shaft 38 and valve stem 20 are rotated in one direction, and as the pistons 30 and 32 move longitudinally outwardly away from each other, the shaft 38 and valve stem 20 are rotated in the other direction.

A pressure fluid such as hydraulic fluid or air is selectively supplied to opposite sides of the pistons 30 and 32 to drive them in a manner well known in the art. Some of the porting passages for this fluid are shown at 60 in FIG. 1. When the pistons are in their outer position as shown in FIG. 2, they may be moved inwardly by supplying fluid to the areas adjacent their outer sides and withdrawing fluid from the area intermediate the pistons. Conversely, when the pistons are in their inner position as shown in FIG. 3, they may be moved outwardly by supplying fluid to the area intermediate the pistons and venting the areas adjacent their outer sides.

Figure 4:
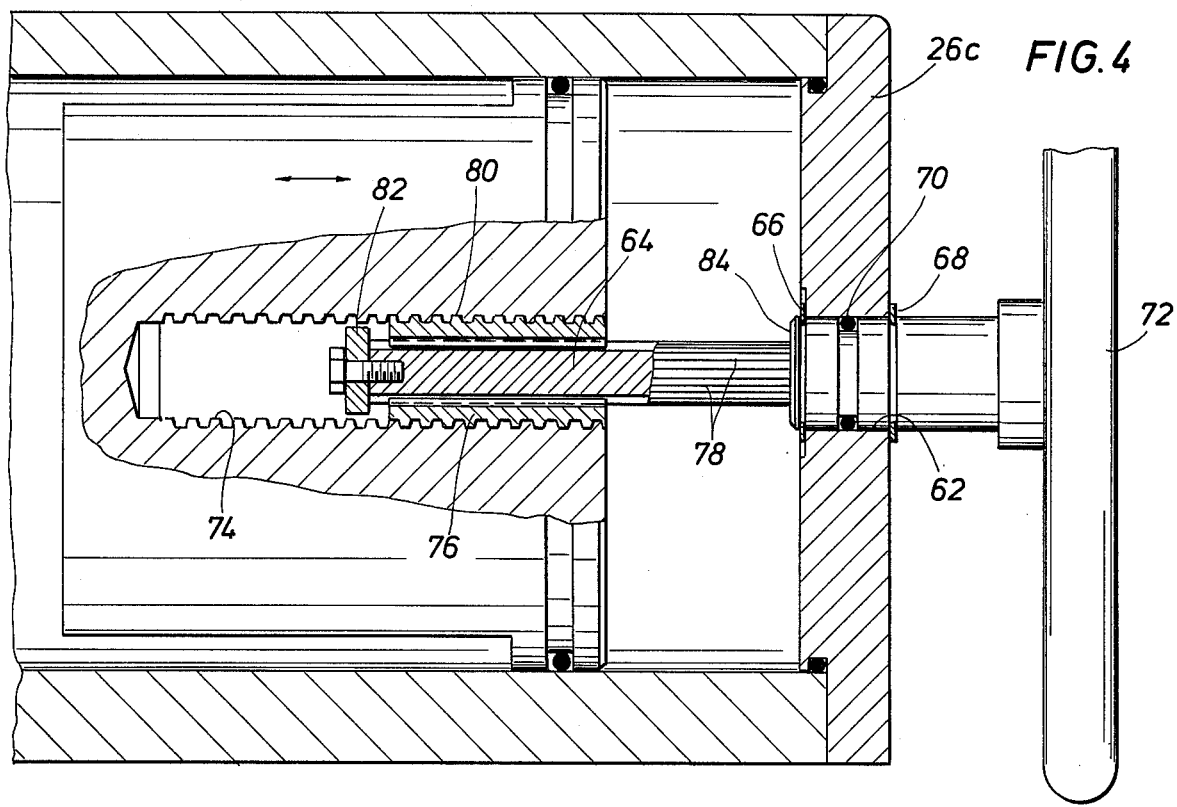
FIG. 4 is a detailed view taken on lines 4—4 of FIG. 3.
Figure 5:
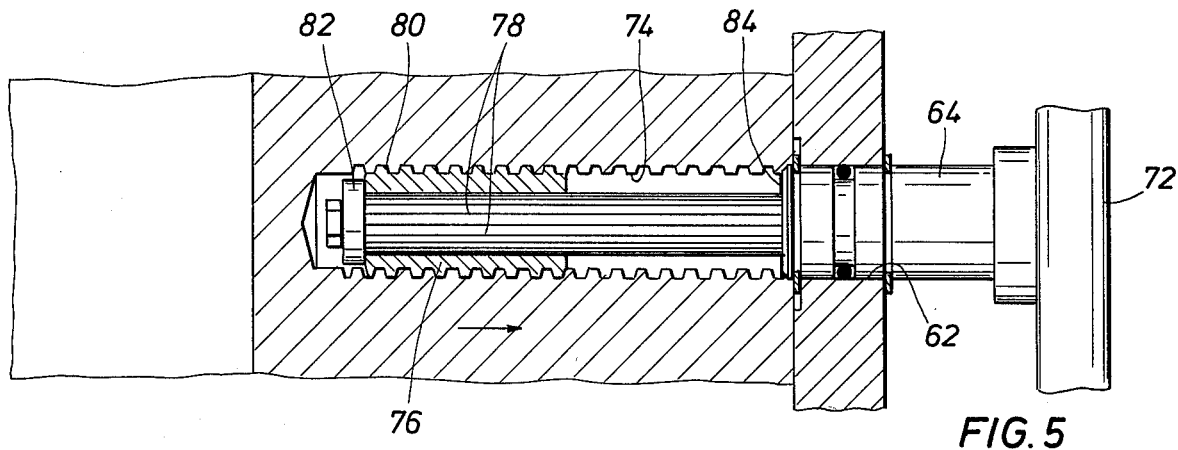
FIG. 5 is a view similar to that of FIG. 4 after the pistons have been extended by the manual override mechanism.
Figure 6:
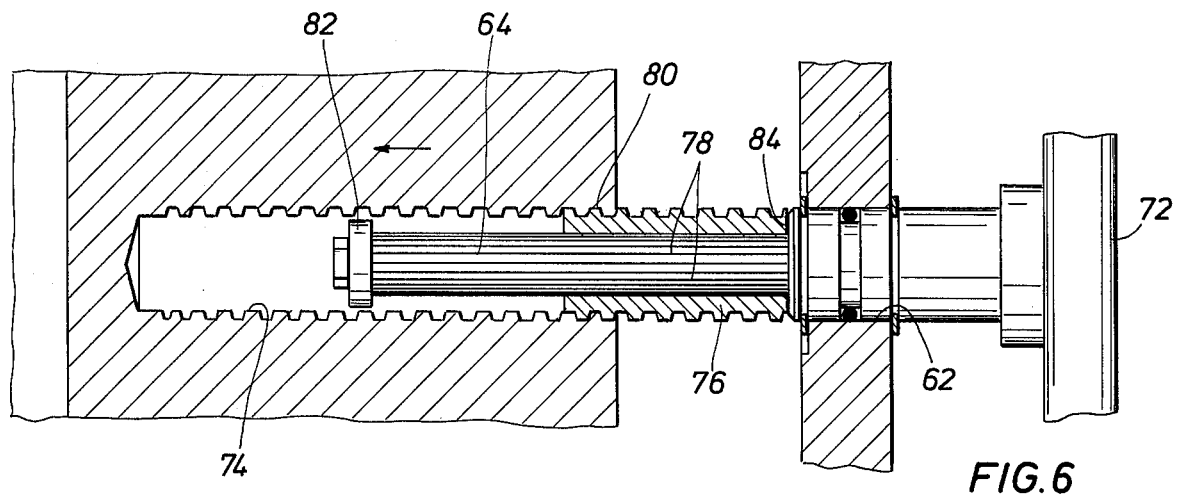
FIG. 6 is a view similar to that of FIG. 4 after the pistons have been retracted by the manual override mechanism.

The housing 26 comprises a central cylindrical body 26a and a pair of end plates 26b and 26c. End plate 26c has a bore 62 therethrough, parallel to the path of the pistons 30 and 32. An elongate rod 64 extends through the bore 62 into the chamber 28 also parallel to the path of the pistons 30 and 32. As best seen in FIGS. 4-6, the rod 64 is rotatable in bore 62 but is prevented from longitudinal movement with respect to housing 26 by a pair of snap rings 66 and 68 in respective circumferential grooves in the rod 64 and abutting respective inner and outer portions of the end plate 26c. The rod 64 is also sealed against the end plate 26c by an o-ring 70. A hand wheel 72 is affixed to the outer end of rod 64 whereby the rod can be conveniently manually rotated.

The drive member 32, 36 closest to end plate 26c also has a longitudinal bore 74 therein extending through piston 32 and into the skirt 36. Rod 64 is received within bore 74 so that drive member 32, 36 telescopes along the rod during its reciprocating movement toward and away from stationary end plate 26c. An annular connector or nut 76 is disposed at least partially between rod 64 and bore 74, i.e. nut 76 encircles rod 64 and is at all times at least partially disposed in bore 74. Nut 76 is splined to rod 64 as indicated at 78 for telescopic but non-rotating movement on rod 64. Nut 76 is also threadedly connected to bore 74 as indicated at 80. Thus rod 64 serves as a torque transmission member, rotation of which will cause rotation of nut 76 and telescopic or longitudinal relative movement between the nut 76 and the drive member 32, 36.

Radially extending flange 82 and radially extending shoulder 84 on rod 64, adjacent its longitudinally inner end and the inner surface of end plate 26c respectively, serve as stops for the nut 76. The portion of rod 64 within the chamber 28 is of approximately the same length as the bore 74. The nut 76 is substantially shorter than either the bore 74 or the portion of rod 64 within the chamber 28 but is at least slightly longer than the length of travel or stroke of the drive members. Thus the nut 76 will always be at least partially disposed within the bore 74.

FIGS. 2-4 show the relative position of the nut 76 to the other parts of the apparatus during normal or automatic operation of the actuator by the pressure fluid mentioned above. In particular, it is noted that, as the pistons 30 and 32 reciprocate during such normal operation, the nut 76 moves with drive member 32, 36 and is always disposed substantially entirely within bore 74 at the longitudinally outer end of the bore. When the apparatus is in the position shown in FIGS. 3 and 4, the valve 10 is closed. If the drive fluid system should fail at this point and it should be necessary to open the valve 10, this can be done by means of the manual override mechanism. In particular, the hand wheel 72 would be rotated in a direction, which may be indicated in an instruction panel on the exterior of the actuator, which would tend to move the nut 76 longitudinally inwardly in the bore 74. However, since the nut 76 is prevented from so moving by its engagement with the inner stop 82, the drive member 32, 36 will instead be forced to move longitudinally outwardly until the parts are in the relative positions shown in FIG. 5. This movement of the drive member 32, 36 will rotate shaft 38 and valve stem 20 to open the valve and will also move the drive member 30, 34 outwardly by virtue of the rack and pinion linkage 48, 50, 56, 58.

With the parts in the positions shown in FIG. 5, the hand wheel 72 may be rotated in the reverse direction to return the nut 76 to the outer end of bore 74 as indicated in FIG. 2 without causing further movement of the pistons, etc. This new position, shown in FIG. 2 will be the same as if the valve had been opened by the normal fluid pressure type of operation. From the position shown in FIG. 2, regardless of whether it has been reached by normal operation or by the above-described operation of the manual override, the manual override can again be used to close the valve 10. The hand wheel 72 is rotated in the direction which would tend to move the nut 76 outwardly in the bore 74. However, since the nut 76 is in abutment with stop 84, the drive member 32, 36 will instead be forced to move inwardly to the position shown in FIG. 6 simultaneously moving drive member 30, 34 as well as shaft 38, valve stem 20, and valve element 18. The mechanism can then be reset for resumed automatic operation or for further manual operation by reverse rotation of the hand wheel to return the nut 76 to the position shown in FIGS. 3 and 4.

From the foregoing description, it will be apparent that the mechanism of the present invention provides a simple, economical, and reliable manual override means for an actuator having a movable drive member. The override mechanism can easily be incorporated into conventional actuators with a minimum of expense, modification of the actuator, and increase in the space requirement for the modified apparatus. The override mechanism can be used effectively with many types of actuators other than the type shown, including those which involve strictly reciprocating movement and do not convert this movement to rotary movement. For example, it may be used in connection with slide valves or gate valves. The override can also be used with actuators in which the drive member is rotary rather than reciprocating by connecting the connector to the rotary drive member with a worm and wheel type gearing arrangement. The apparatus can also be used as either a primary or override type manual control for mechanisms other than actuators having movable members. Numerous modifications of the preferred embodiment described above can be made without departing from the invention. For example, in the embodiment shown, the nut is normally disposed within but at the outer end of the bore in the drive member. Other arrangements, however, could be used. It is thus intended that the scope of the invention be limited only by the claims which follow.

I claim:
1. An actuator and override mechanism comprising:
a housing having a chamber therein;
a drive member disposed in said chamber for movement therein;
an elongate torque transmission member rotatably mounted in said housing and extending into said chamber;
an annular connector disposed at least partially between said torque transmission member and said drive member, said connector being connected to said torque transmission member for longitudinal but non-rotating movement therealong and threadedly connected to said drive member for relative movement of said drive member and said connector upon rotation of said torque transmission member;
means fixing said torque transmission member against longitudinal movement with respect to said housing;
a pair of spaced stop means for limiting longitudinal movement of said connector along said torque transmission member;
and means for rotating said torque transmission member.

2. An actuator and override mechanism comprising:
a housing having a chamber therein;
a drive member disposed in said chamber for reciprocation therein;
an elongate torque transmission member rotatably mounted in said housing and extending into said chamber, the axis of said torque transmission member being generally parallel to the path of said drive member, and said drive member being telescopically mounted on said torque transmission member for said reciprocation;
an annular connector disposed at least partially between said torque transmission and said drive member, said connector being connected to said torque transmission member for longitudinal but not rotating movemment therealong and threadedly connected to said drive member for relative longitudinal movement of said drive member and said drive member and said connector upon rotation of said torque transmission member;
means fixing said torque transmission member against longitudinal movement with respect to said housing;
a pair of spaced stop means for limiting longitudinal movement of said connector along said torque transmission member;
and means for rotating said torque transmission member.

3. The mechanism of claim 2 wherein said chamber is cylindrical and said drive member comprises a first piston.

4. The mechanism of claim 3 further comprising a rotating member disposed adjacent the exterior of said housing, said rotatng member having its axis generally transverse to the path of said drive member, and linkage means interconnecting said drive member and said rotating member for converting the reciprocating movement of said drive member to rotating movement of said rotating member.

5. The mechanism of claim 4 wherein said linkage means includes a shaft coaxial with said rotating member and connected to said rotating member for joint rotation, said shaft extending through said housing into said chamber, pinion means rigidly coaxially carried by said shaft within said chamber, and a rack on said drive member depending longitudinally from said first piston and engaging said pinion means.

6. The mechanism of claim 5 wheren said rack is formed on a skirt depending longitudinally inwardly from said first piston, said drive member having a threaded bore through said first piston and into said skirt substantially parallel to the axis of said torque transmission member, said torque transmission member comprising an elongate rod at least partially disposed in said bore.

7. The mechanism of claim 5 further comprising a second piston disposed in said chamber opposite said drive member, said second piston also having a rack depending longitudinally therefrom engaging said pinion means.

8. The mechanism of claim 3 further comprising means for selectively injecting fluid into said chamber and withdrawing fluid from said chamber on each side of said first piston.

9. The mechanism of claim 2 wherein said connector is coaxial with said torque transmission member and telescopic with said torque transmission member and with said drive member.

10. The mechanism of claim 9 wherein said drive member has a threaded bore therein substantially parallel to the axis of said torque transmission member, said torque transmission member comprising an elongate rod, and said rod and said connector being at least partially disposed in said bore.

11. The mechanism of claim 10 wherein the length of said connector is substantially less than that of said rod but greater than the length of travel of said drive member.

12. The mechanism of claim 11 wherein one of said stop means comprises a first radially extending flange carried by said rod adjacent the longitudinally inner end of said rod and the other of said stop means comprises a second radially extending shoulder on said rod adjacent the inner surface of said housing.

13. The mechanism of claim 11 wherein said connector is normally located adjacent the longitudinally outer end of, but substantially entirely within, said bore.

14. The mechanism of claim 9 wherein said connector is splined to said torque transmission member.

15. In a mechanism having a stationary member and a movable member mounted for movemment with respect to said stationary member, manual control apparatus for effecting said movement of said movable member comprising:

an elongate torque transmission member rotatably mounted in said stationary member and extending toward said movable member;

an annular connector disposed at least partially between said torque transmission member and said movable member, said connector being connected to said torque transmission member for longitudinal but non-rotating movement therealong and threadedly connected to said movable member for relative movement of said movable member and said connector upon rotation of said torque transmission member;

means fixing with torque transmission member against longitudinal movement with respect to said stationary member;

a pair of space stop means for limiting longitudinal movement of said connector along said torque transmission member;

and means for rotating said torque transmission member.

16. In a mechanism having a stationary member and a reciprocating member mounted for movement toward and away from said stationary member, manual control apparatus for effecting said movement of said reciprocating member comprising:

an elongate torque transmission member rotatably mounted in said stationary member and extending toward said reciprocating member, the axis of said torque transmission member being generally parallel to the path of said reciprocating member and said reciprocating member being telescopically mounted on said torque transmission member for said movement;

an annular connector disposed at least partially between said torque transmission member and said movable member, said connector being connected to said torque transmission member for longitudinal but non-rotating movement therealong and threadedly connected to said reciprocating member for relative longitudinal movement of said reciprocating member and said connector upon rotation of said torque transmission member;

means fixing said torque transmission member against longitudinal movement with respect to said stationary member;

a pair of spaced stop means for limiting longitudinal movement of said connector along said torque transmission member;

and means for rotating said torque transmission member.

17. The mechanism of claim 16 wherein said connector is coaxial with said torque transmission member and telescopic with said torque transmission member and with said reciprocating member.

18. The mechanism of claim 17 wherin said reciprocating member has a threaded bore therein generally parallel to the axis of said torque transmission member, said torque transmission member comprising an elongate rod, and said rod and said connector being at least partially disposed in said bore.

19. The mechanism of claim 18 wherein the length of said connector is substantially less than that of said rod but greater than the length of travel of said reciprocating member.

20. The mechanism of claim 19 wherein one of said stop means comprises a first radially extending flange carried by said rod adjacent the end of said rod distal said stationary member and the other of said stop means comprises a second radially extending shoulder on said rod adjacent said stationary member.

21. The mechanism of claim 19 wherein said connector is normally located adjacent the end of said bore closest to said stationary member but substantially entirely within said bore.

22. The mechanism of claim 17 wherein said connector is splined to said torque transmission member.

* * * * *